US012569783B2

(12) United States Patent
Hwang et al.

(10) Patent No.: US 12,569,783 B2
(45) Date of Patent: Mar. 10, 2026

(54) CONSTANT FLOW CONDITIONER HAVING MICROBUBBLE REMOVAL FUNCTION

(71) Applicant: Bluesen Co., Ltd., Daegu (KR)

(72) Inventors: Kyungyup Hwang, Busan (KR); Youjung Kim, Busan (KR); Jeongmin Ahn, Busan (KR); Deukhyeon Jeun, Busan (KR); Changsik Son, Busan (KR)

(73) Assignee: Bluesen Co., Ltd., Daegu (KR)

( * ) Notice: Subject to any disclaimer, the term of this patent is extended or adjusted under 35 U.S.C. 154(b) by 500 days.

(21) Appl. No.: 18/346,364

(22) Filed: Jul. 3, 2023

(65) Prior Publication Data

US 2023/0347265 A1 Nov. 2, 2023

Related U.S. Application Data

(63) Continuation of application No. PCT/KR2022/010544, filed on Jul. 19, 2022.

(30) Foreign Application Priority Data

Dec. 17, 2021 (KR) ........................ 10-2021-0181211

(51) Int. Cl.
*B01D 19/00* (2006.01)

(52) U.S. Cl.
CPC ................................ *B01D 19/0073* (2013.01)

(58) Field of Classification Search
CPC B01D 19/0073; B01D 19/0063; B01D 35/28; G01N 1/14
See application file for complete search history.

(56) References Cited

U.S. PATENT DOCUMENTS 5,227,052 A 7/1993 Ilves et al.
5,831,727 A 11/1998 Stream et al.

FOREIGN PATENT DOCUMENTS

KR 10-1992-0006741 A 4/1992
KR 10-0232762 B1 12/1999
KR 10-0572370 B1 4/2006
KR 10-0643176 B1 11/2006

*Primary Examiner* — Jennifer Dieterle
*Assistant Examiner* — Phillip Y Shao
(74) *Attorney, Agent, or Firm* — Bridgeway IP Law Group, PLLC; Jihun Kim

(57) ABSTRACT

Proposed is a constant flow conditioner having a microbubble removal function and there is an effect that sample water is supplied at constant flow rate and pressure to a water quality meter regardless of pressure variation of inflow sample due to external factors. Further, there is an effect that it is possible easily remove bubbles in sample water.

7 Claims, 7 Drawing Sheets

CONSTANT FLOW CONDITIONER HAVING MICROBUBBLE REMOVAL FUNCTION

FIELD OF INVENTION

The present disclosure relates to a constant flow conditioner having a microbubble removal function and, in more detail, to a constant flow conditioner having a microbubble removal function that enables sample water to be supplied at constant flow rate and pressure to a water quality meter regardless of variation of pressure of an inflow sample due to external factors and that makes it possible to easily remove bubbles in sample water.

BACKGROUND ART

Recently, with rapid population growth and high-level industrialization, water is extremely contaminated due to various contamination factors, such as air pollution, soil pollution, and contamination by industrial wastes produced by industrial facilities. In particular, contamination of water supply sources and streams cause a big problem with the life of people and normal circulation in the ecosystem.

Accordingly, in order to prevent rivers, streams, water supply sources, etc. from being contaminated by waste water from factories or other contaminants, water quality is periodically examined at the national level for the purpose of continuously monitoring rivers, streams, lakes, and marshes, or water purification and sewage treatment facilities, thereby systemically managing and regulating facilities that discharge contaminants in addition to protecting water supply sources. Further, not only the quality standards of treated water and virus treatment standards at water treatment plants have been enforced, but it has been systemically introduced to monitor in real time even the quality of the water that is supplied through the faucets of consumers, so rules and systems have been established and are being applied so that the nation can drink the tap water without anxiety.

In order to accurately examine water quality, it is required to measure various items and accurately evaluate the items about water quality, depending on the characteristics of the sites, and it is required to be able to determine the state of water quality in real time. As main items for measuring the state of water quality, there are not only water temperature, but hydrogen ion concentration, dissolved oxygen, turbidity, and other various items. Hydrogen ion concentration is a numerical value indicating the degree of acid or alkali of a substance and turbidity shows the degree of muddiness of water by numerical value.

When measuring turbidity of various items for measuring the state of water quality using an optical measurement method, it is impossible to accurately measure turbidity unless removing bubbles in sample water. This is because when light meets a bubble, dispersed light may be produced by reflection or refraction on the surface of the bubble and even the light that has passed through the bubble reflects because it passes through media having different densities.

Accordingly, it has been disclosed in Korean Patent No. 10-0572370, etc. to remove bubbles in sample water by sending sample water, which has flowed inside through an inlet, over a cylindrical part at the center. However, such a related art has a problem that it is possible to remove large bubbles, but impossible to remove microbubbles, and bubbles are not removed well when a large amount of water is supplied.

Meanwhile, in order to accurately measure the state of water quality, not only bubbles in sample water should be removed, but sample water should be provided at constant flow rate and pressure to a water quality meter that measures the state of water quality. However, in an environment of frequent variation in pressure of sample water that is supplied to a water quality meter from the outside, there is a problem that the reliability of the water quality measured by the water quality meter is deteriorated.

DISCLOSURE

Technical Problem

An objective of the present disclosure for solving the problems in the related art described above is to provide a constant flow conditioner having a microbubble removal function that enables sample water to be supplied at constant flow rate and pressure to a water quality meter regardless of variation of pressure of the sample water.

Further, another objective of the present disclosure is to provide a constant flow conditioner having a microbubble removal function that makes it possible to easily remove bubbles in sample water before measuring the quality of the sample water.

Technical Solution

In order to achieve the objectives, the present disclosure provides a constant flow conditioner having a microbubble removal function, the constant flow conditioner including: a body including a first pipe formed in a hollow column shape and configured to receive sample water through an open first end thereof, a second pipe positioned parallel with the first pipe with a gap therebetween, formed in a hollow column shape, and configured to discharge sample water through an open first end thereof, and a bridge connecting a side of the first pipe and a side of the second pipe to each other; a constant pressure valve mounted at a first end of the first pipe such that sample water from the outside flows at constant flow rate and pressure into the first pipe; a resistance valve mounted at a first end of the second pipe such that sample water flowing through the second pipe is discharged at constant flow rate and pressure out of the second pipe; and a plurality of strainers formed in pipe shapes and installed in the first pipe, in which sample water flowing into the first pipe flows to the second pipe sequentially through the strainers and the bridge, and when sample water flowing in the first pipe passes through the strainers, bubbles in the sample water stick to outer walls or inner walls of the strainers.

Further, the first pipe may be connected to a first side of the bridge, a lower end of the first pipe may extend lower than the first side of the bridge, and an upper end of the first pipe may extend higher than the first side of the bridge; the second pipe may be connected to a second side of the bridge, a lower end of the second pipe may extend lower than the second side of the bridge, and an upper end of the second pipe may extend higher than the second side of the bridge; and lower ends of the strainers may be positioned to face the lower end of the first pipe and upper ends of the strainers may be positioned lower than an upper portion of the bridge.

Further, the strainers may include: a plurality of bubble removal pipes formed in hollow pipe shapes and connected with each other on outer edges adjacent to each other; and a movement guide pipe connected to first sides of the bubble removal pipes and having a first end extending higher than the bubble removable pipes.

Further, the strainers may include: a plurality of bubble removal pipes formed in hollow pipe shapes and connected with each other on outer edges adjacent to each other; and a gap guide pipe connected to first sides of the bubble removal pipes and having a first end extending lower than the bubble removable pipes, wherein a lower end of the gap guide pipe is positioned to be supported by the lower end of the first pipe, and lower ends of the bubble removal pipes are positioned to be spaced apart from the lower end of the first pipe.

Further, a pressure switch configured to sense variation of internal pressure of the first pipe and transmit a contact signal to the outside may be mounted at a second end of the first pipe.

Further, the pressure switch may check whether internal pressure of the first pipe increases over the atmospheric pressure and transmit a contact signal of an on or off state to the outside.

Further, an air vent configured to discharge air or bubbles in the second pipe to the outside such that internal pressure of the second pipe is maintained at a predetermined level may be mounted at a second end of the second pipe.

Advantageous Effects

Since the present disclosure includes a constant pressure valve and a resistance valve, there is an effect that sample water is supplied at constant flow rate and pressure to a water quality meter regardless of pressure variation of inflow sample due to external factors.

Further, since bubble removal pipes are provided in a first pipe, there is an effect that it is possible to easily remove bubbles in sample water.

Further, since lower ends of the bubble removal pipes are positioned to be spaced apart from the lower end of the first pipe, there is an effect that sample water flowing into the first pipe through an inflow hole is uniformly sent to the bubble removal pipes through the space between the lower end of the first pipe and the lower ends of the bubble removal pipes.

Further, since a movement guide pipe protrudes higher than the bubble removal pipes, there are effects that it is possible to restrict upward movements of the movement guide pipe and to easily take out the bubble removal pipes from the first pipe.

DESCRIPTION OF REFERENCE NUMERALS

Figure 1:
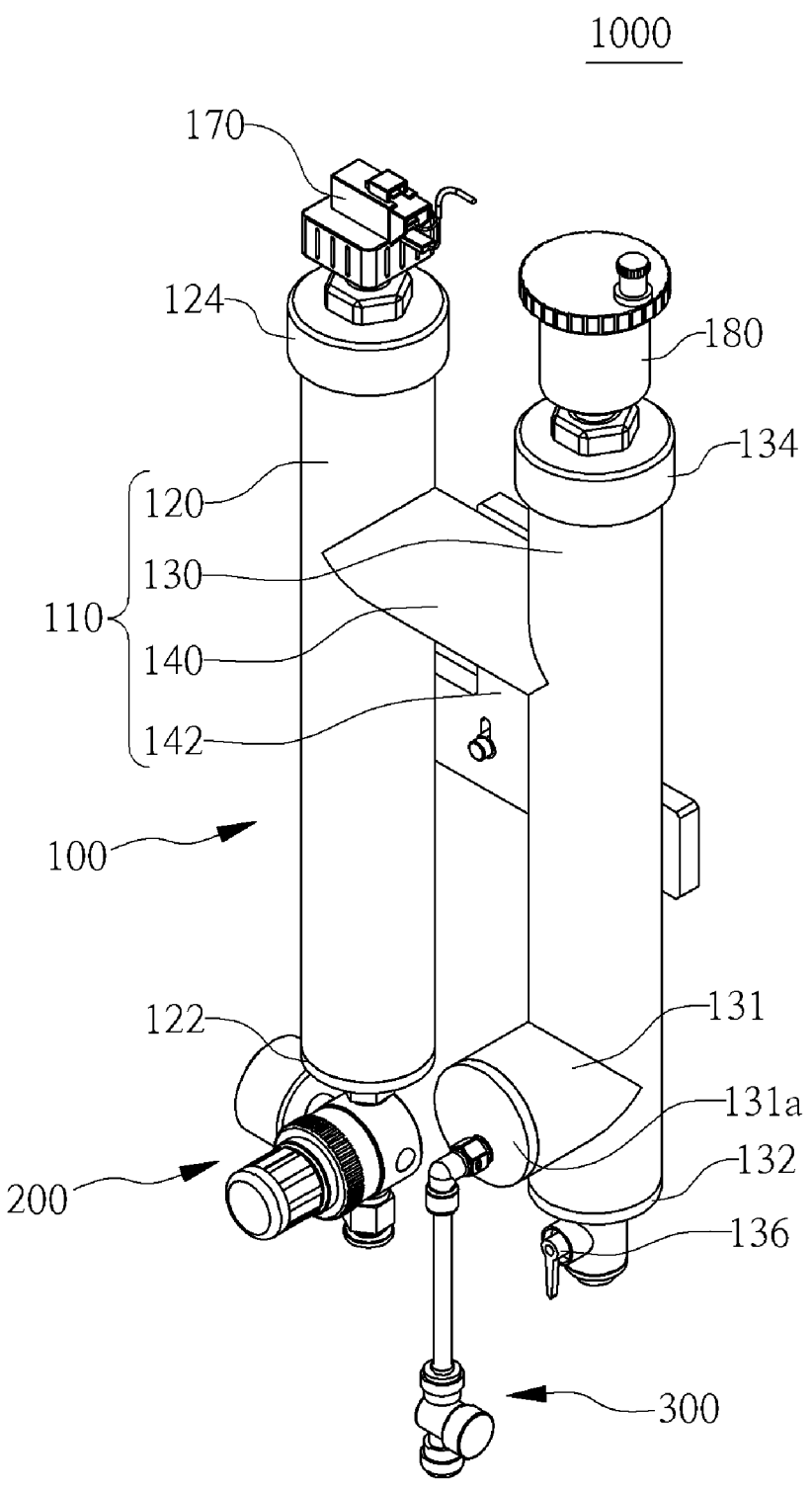
FIG. 1 is a view schematically showing a constant flow conditioner having a microbubble removal function according to a preferred embodiment of the present disclosure.

1000: constant flow conditioner having microbubble removal function
100: bubble remover
110: body 120: first pipe
122: first bottom cap 122*a*: inflow hole
124: first top cap 124*a*: first top hole
130: second pipe 131: diverging way
131*a*: cap 131*b*: outflow hole
132: second bottom cap 132*a*: drain hole
134: second top cap 134*a*: second top hole
136: drain 140: bridge
142: bracket 150: strainer
152: bubble removal pipe 154: movement guide pipe
156: gap guide pipe 160: disc assembly
162: disc 162*a*: through-hole
162-1: top disc 162-2: bottom disc
163: supporting protrusion 164: supporting frame
170: pressure switch 180: air vent
200: constant pressure valve
300: resistance valve

BEST MODE

Hereafter, a constant flow conditioner having a microbubble removal function according to a preferred embodiment of the present disclosure is described in more detail with reference to the accompanying drawings.

FIG. 1 is a view schematically showing a constant flow conditioner having a microbubble removal function according to a preferred embodiment of the present disclosure.

Referring to FIG. 1, a constant flow conditioner 1000 having a microbubble removal function that includes a bubble remover 100, a constant pressure valve 200, and a resistance valve 300. The bubble remover 100 includes a body 110 and a strainer 150, and, depending on cases, may further include a disc assembly 160, a pressure switch 170, and an air vent 180.

The body 110, which is formed in a substantially "H" shape, includes a first pipe 120, a second pipe 130, a bridge 140, and a bracket 142. The first pipe 120 is formed in a hollow column shape and is open at the longitudinal lower end and upper end. The second pipe 130 is positioned parallel with the first pipe 120 with a gap therebetween, is formed in a hollow column shape, and is open at the longitudinal lower end and upper end. Further, a specific diverging way 131 protrudes outward from the second pipe 130 at a lower portion of the second pipe 130. Further, a first bottom cap 122 is mounted at the open lower end of the first pipe 120 and a first top cap 124 is mounted at the open upper end of the first pipe 120. A second bottom cap 132 is mounted at the open lower end of the second pipe 130 and a second top cap 134 is mounted at the open upper end of the second pipe 130. A drain hole 132*a* (shown in FIG. 3) is formed in the second bottom cap 132 and is opened and closed by a drain 136.

The strainer 150 is inserted in the first pipe 120 and the disc assembly 160 is inserted in the second pipe 130 and removes bubbles in sample water, which will be described below.

The bridge 140 connects a side of the first pipe 120 and a side of the second pipe 130 to each other so that fluid in the first pipe 120 can move into the second pipe 130 through the bridge 140. In this configuration, the lower end of the first pipe 120 extends lower than a first side of the bridge 140 and the upper end of the first pipe 120 extends higher than the first side of the bridge 140. Further, the lower end of the second pipe 130 extends downward from a second side of the bridge 140 and the upper end of the second pipe 130 extends upward from the second side of the bridge 140. The bracket 142 is connected to the rear of the bridge 140 and serves to couple the body 110 to a wall, etc.

Further, the body 110 is equipped with the constant pressure valve 200, the resistance valve 300, the pressure switch 170, and the air vent 180. The constant pressure valve 200 is mounted at the first bottom cap 122 and controls sample water, which is supplied from the outside, to flow at constant flow rate and pressure into the first pipe 120 when the external sample water flows into the first pipe 120 through an inflow hole 122a (shown in FIG. 3) formed through the first bottom cap 122. For example, when external sample water is supplied over reference flow rate and pressure to the constant pressure valve 200, the constant pressure valve 200 sends the external sample water to the inflow hole 122a after controlling the flow rate and pressure to the reference levels, whereby sample water that flows into the first pipe 120 is always controlled at constant flow rate and pressure. The constant pressure valve 200 can control external sample water to reference flow rate and pressure, for example, by adjusting the space that opens toward the inflow hole 122a.

The resistance valve 300 is mounted at the cap 131a discharges sample water, which flows through the second pipe 130, at constant flow rate and pressure out of the second pipe 130 through an outflow hole 131b (shown in FIG. 5) of the cap 131a Since the present disclosure includes the constant pressure valve 200 and the resistance valve 300, as described above, there is an effect that sample water is supplied to a water quality meter A (shown in FIG. 7) at constant flow rate and pressure regardless of pressure variation of inflow sample due to external factors. The water quality meter A is a common component that measures the quality of sample water.

The pressure switch 170 is mounted at the first top cap 124 and receives internal pressure of the first pipe 120 through a first top hole 124a (shown in FIG. 3) formed through the first top cap 124. The pressure switch 170 checks whether sample water, which is supplied into the first pipe 120 from the outside, flows at constant flow rate and pressure into the first pipe 120 For example, when sample water flows at normal flow rate and pressure into the first pipe 120, the internal pressure of the first pipe 120 increases over the atmospheric pressure and the pressure switch 170 senses this and transmits a contact signal of an "on" state to the water quality meter A at the outside. The water quality meter A receiving the contact signal of an "on" state from the pressure switch 170 recognizes that it is currently a "normal flow" state, and informs an operator of the state by showing that sample water normally flows inside on a display of the water quality meter A. When the internal pressure of the first pipe 120 drops under the atmospheric pressure, it means that sample water does not normally flow inside, so the pressure switch 170 senses this and transmits a contact signal of an "off" state to the water quality meter A. The water quality meter A receiving the contact signal of an "off" state from the pressure switch 170 recognizes that it is currently a "check flow" state, and informs an operator of the state by showing that sample water does not normally flow inside on a display of the water quality meter A.

The air vent 180 is mounted at the second top cap 134 of the second pipe 130 and discharges bubbles or air in the second pipe 130 to the outside. That is, when bubbles in sample water are removed by the strainer 150 and collected to the upper portion of the second pipe 130, the bubbles or air collected at the upper portion of the second pipe 130 is discharged out of the body 110 through a second top hole 134a (shown in FIG. 3) formed through the second top cap 134 and the air vent 180. The air vent 180 discharges large bubbles collected at the upper portion of the second pipe 130 to the outside of the body 110, so the air vent 180 has an effect of maintaining the internal pressure of the second pipe 130 at a predetermined level and supplying sample water at constant pressure and flow rate to the water quality meter A.

Figure 2:
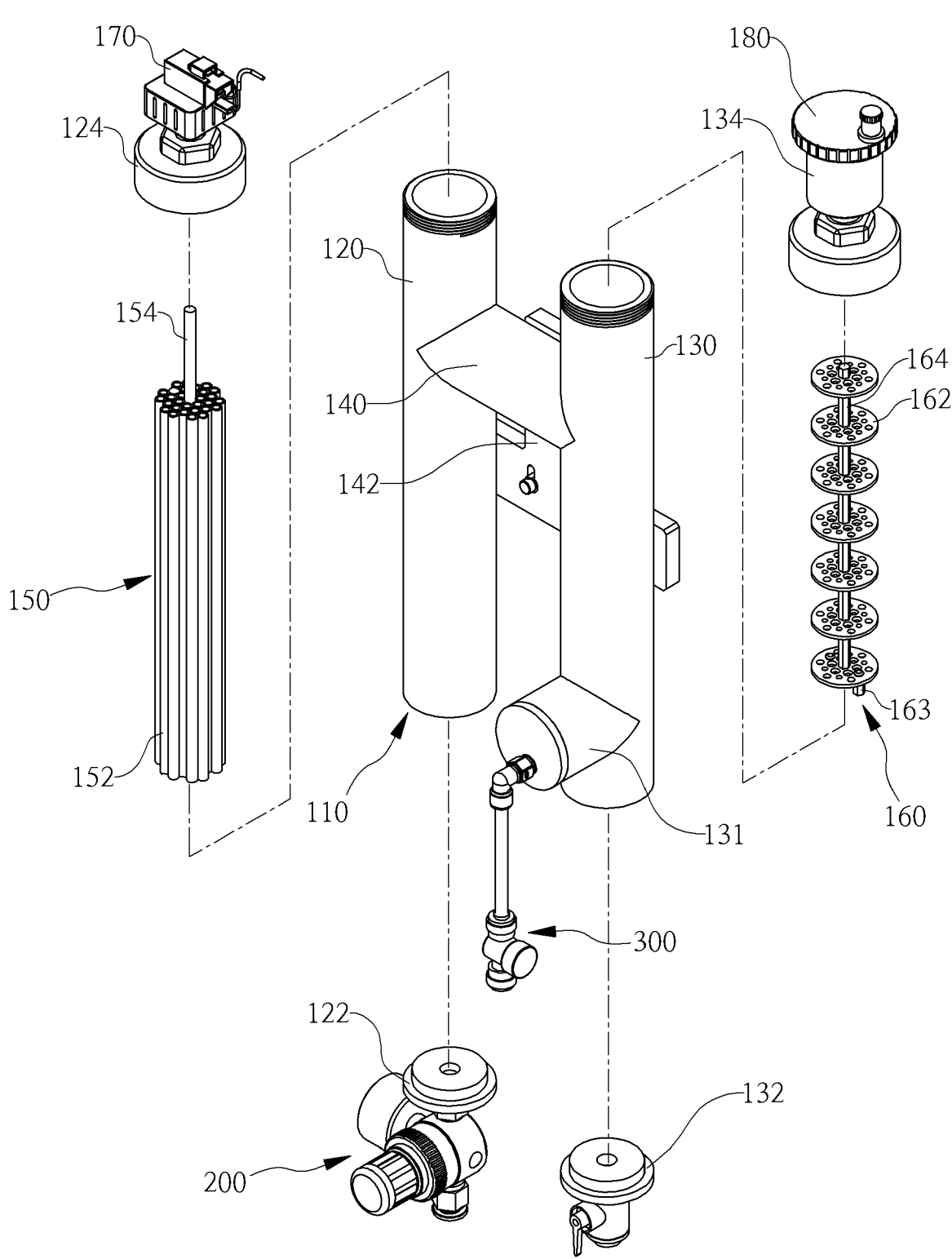
FIG. 2 is an exploded view showing the constant flow conditioner having a microbubble removal function according to a preferred embodiment of the present disclosure.
Figure 3:
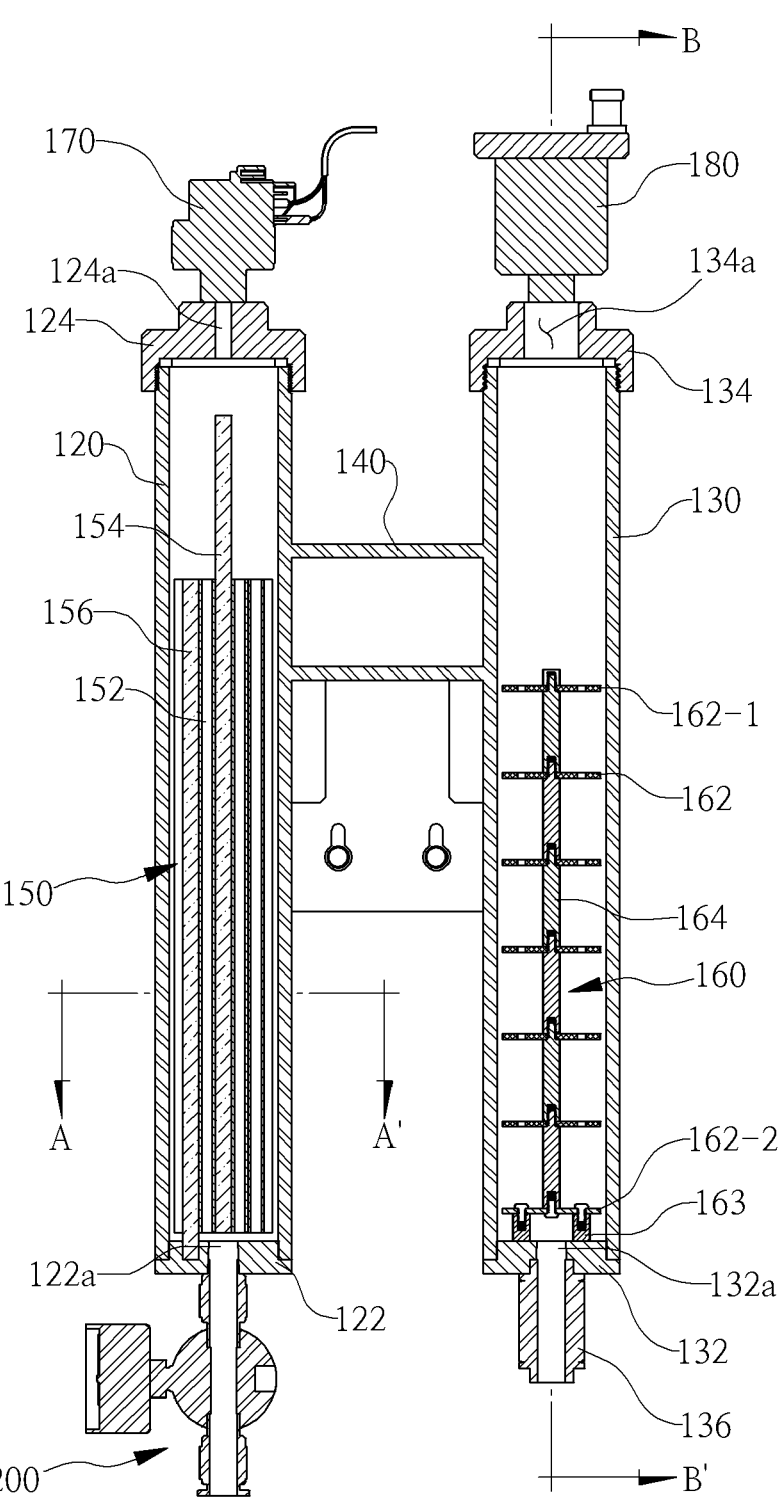
FIG. 3 is a vertical cross-sectional view showing the constant flow conditioner having a microbubble removal function according to a preferred embodiment of the present disclosure.
Figure 4:
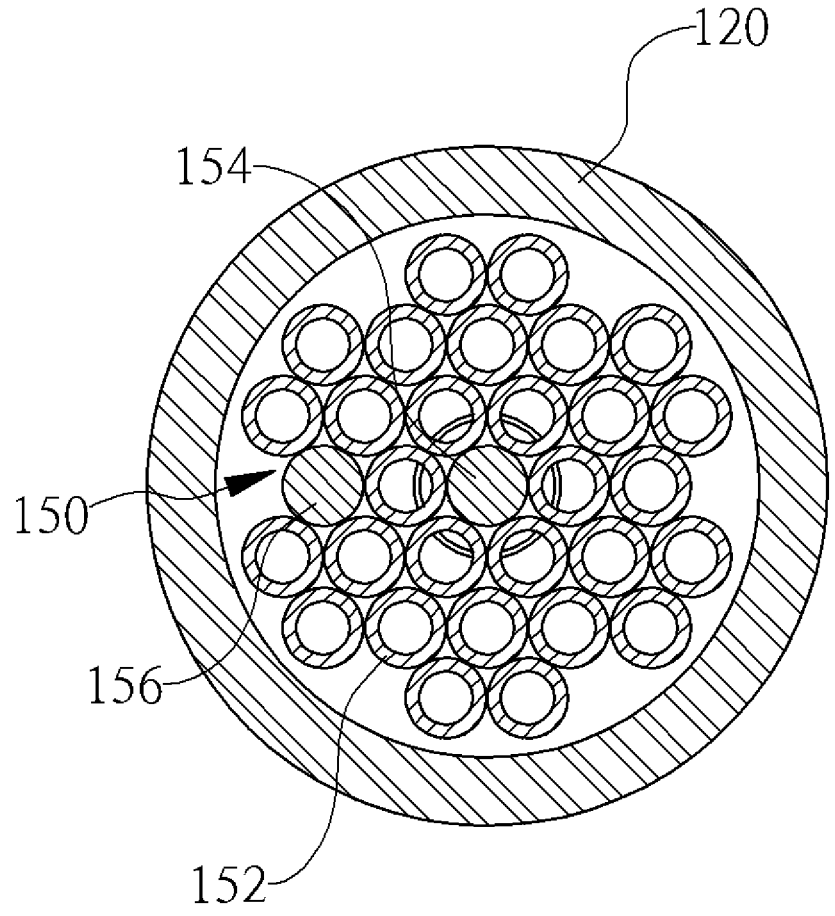
FIG. 4 is a view showing an A-A' cross-section of FIG. 3.

FIG. 2 is an exploded view showing the constant flow conditioner having a microbubble removal function according to a preferred embodiment of the present disclosure, FIG. 3 is a vertical cross-sectional view showing the constant flow conditioner having a microbubble removal function according to a preferred embodiment of the present disclosure, and FIG. 4 is a view showing an A-A' cross-section of FIG. 3.

Referring to FIGS. 2 to 4, the strainer 150 includes a plurality of bubble removal pipes 152 inserted in the first pipe 120 and may further include a gap guide pipe 156 and a movement guide pipe 154.

The bubble removal pipe 152 is formed in a hollow pipe shape and a plurality of bubble removal pipes 152 is gathered and inserted in the first pipe 120. The bubble removal pipes 152 are formed such that adjacent outer edges are connected to each other. The longitudinal lower ends of the bubble removal pipes 152 are positioned to face the lower end of the first pipe 120 and the longitudinal upper ends of the bubble removal pipes 152 are positioned lower than the upper portion of the bridge 140. Further, while sample water flowing into the first pipe 120 through the lower end of the first pipe 120 passes through the bubble removal pipes 152, the moving speed of bubbles in the sample water is decreased by tension between the bubble removable pipes 152 and the sample water. Further, the bubbles in the sample water stick to the inner walls and the outer walls of the bubble removal pipes 152, so microbubbles in the sample water are lumped into large bubbles and caught in the bubble removal pipes 152.

Sample water flowing into the first pipe 120 passes through the bubble removal pipes 152 while filling the inside of the first pipe 120, and then moves to the second pipe 130 through the bridge 140. In this case, when vacuum is generated in an air pocket at the upper portion of the second pipe 130, large bubbles formed in the bubble removal pipes 152 move with the sample water to the second pipe 130 through the bridge 140. Next, the large bubbles that have moved in the second pipe 130 are guided to the air pocket and finally discharged outside through the air vent 180. As described above, since the present disclosure includes the bubble removal pipes 152 in the first pipe 120, there is an effect of easily removing bubbles in sample water.

The gap guide pipe 156 is connected to a side of one bubble removal pipe 152 of the bubble removal pipes 152, and a first end thereof extends to protrude lower than the bubble removal pipes 152. The lower end of the gap guide pipe 156 is positioned to be supported by the lower end of the first pipe 120, so the lower ends of the bubble removal pipes 152 are positioned to be slightly spaced apart from the lower end of the first pipe 120 by the gap guide pipe 156. Since the lower ends of the bubble removal pipes 152 are positioned to be spaced apart from the lower end of the first pipe 120, as described above, there is an effect that sample water flowing into the first pipe 120 through the inflow hole 122a is uniformly sent to the bubble removal pipes 152 through the space between the lower end of the first pipe 120 and the lower ends of the bubble removal pipes 152.

The movement guide pipe 154 is connected to a side of another bubble removal pipe 152 of the bubble removal pipes 152, and the upper end thereof extends higher than the bubble removal pipes 152. The movement guide pipe 154 prevents the bubble removal pipes 152 from being moved up over a predetermined level by buoyancy. That is, when sample water fills up in the first pipe 120 or the pressure of sampling water flowing into the first pipe 120 is transmitted to the bubble removal pipes 152, the bubble removal pipes 152 come up in the first pipe 120 due to buoyancy, the pressure of the sample water, etc. The bubble removal pipes 152 come up, the upper ends of the bubble removal pipes 152 go up over the upper portion of the bridge 140, so bubbles sticking to the bubble removal pipes 152 cannot easily move to the second pipe 130 through the bridge 140. The movement guide pipe 154 is designed to solve this problem and the upper end of the movement guide pipe 154 is positioned higher than the upper end of the bubble removal pipes 152, so even though the bubble removal pipes 152 come up, the upper end of the movement guide pipe 154 hits against the upper end of the first pipe 120, whereby the bubble removal pipes 152 no longer move up. As described above, since the present disclosure includes the movement guide pipe 154 protruding higher than the bubble removal pipes 152, there is an effect of being able to restrict upward movement of the bubble removal pipes 152. Further, there is an effect that when a worker cleans the inside of the body 110, the worker can easily takes the bubble removal pipes 152 out of the first pipe 120 with the movement guide pipe 154 held in his/her hand.

The gap guide pipe 156 or the movement guide pipe 154 may be omitted, depending on cases.

Figure 5:
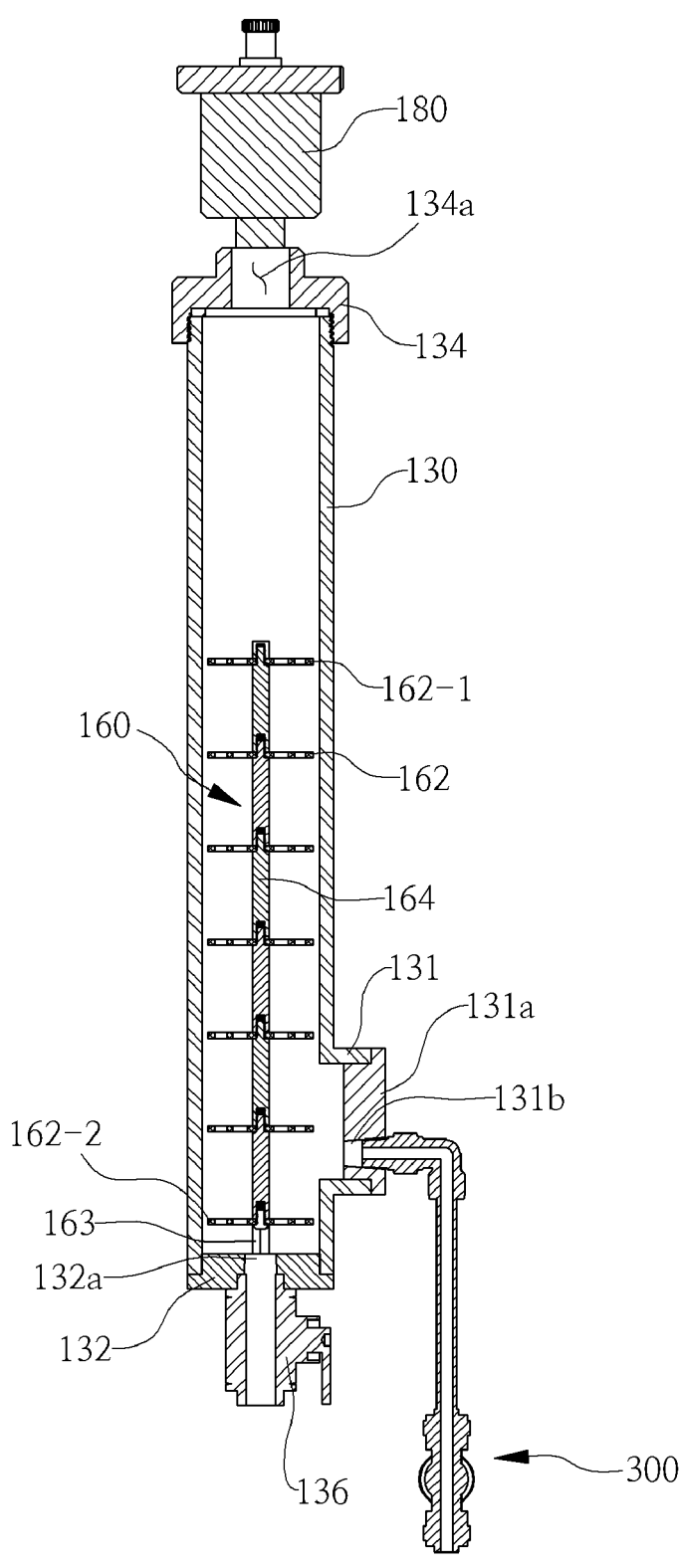
FIG. 5 is a view showing a B-B' cross-section of FIG. 3.
Figure 6:
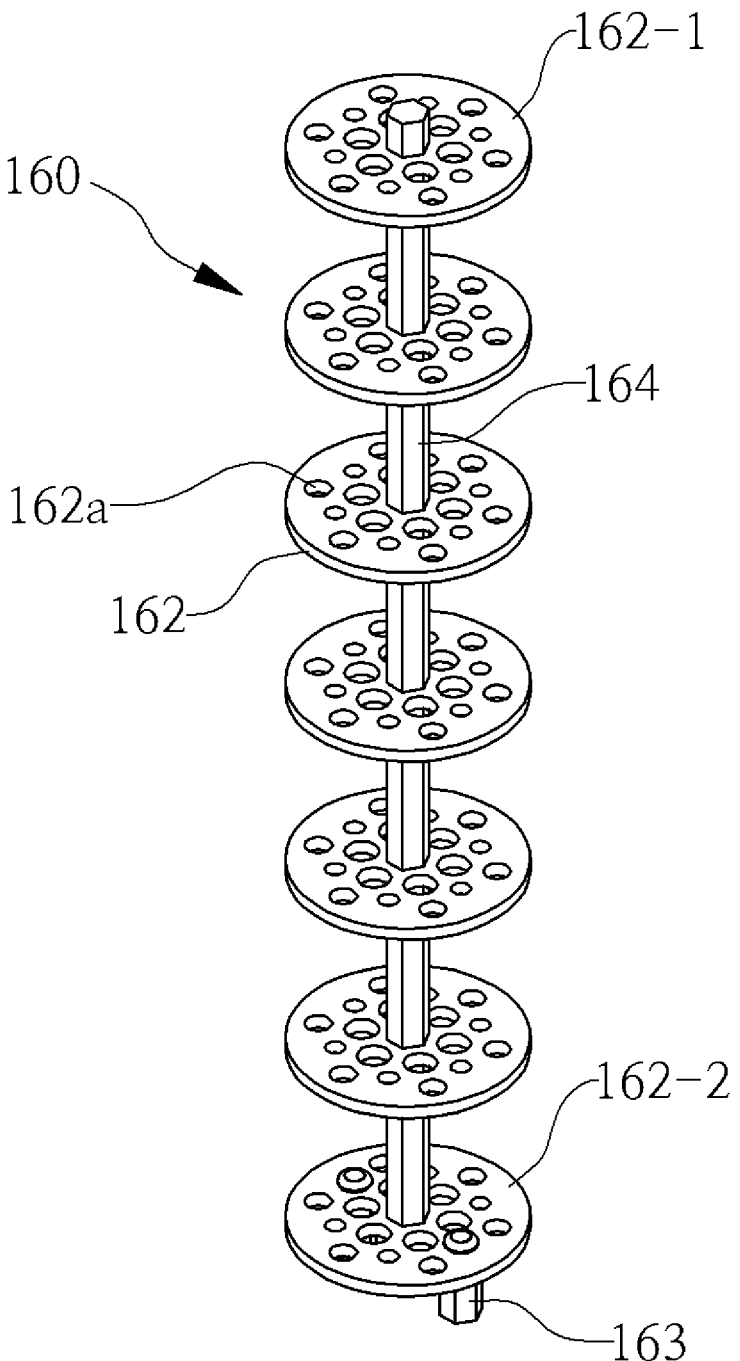
FIG. 6 is a view showing a disc assembly of the constant flow conditioner having a microbubble removal function according to a preferred embodiment of the present disclosure.

FIG. 5 is a view showing an B-B' cross-section of FIG. 3 and FIG. 6 is a view showing a disc assembly of the constant flow conditioner having a microbubble removal function according to a preferred embodiment of the present disclosure.

Referring to FIGS. 3, 5, and 6, the disc assembly 160 includes a disc 162 and a supporting frame 164. The disc 162, for example, is formed in a circular plate shape and a plurality of discs 162 is arranged in parallel longitudinally in the second pipe 130. The supporting frame 164 is longitudinally elongated and is disposed through the discs 162. The supporting frame 164 and the discs 162 are connected to each other, so the positions of the discs 162 inserted in the second pipe 130 are fixed. A plurality of through-holes 162$a$ is formed through the discs 162, so when sample water moves to the lower end of the second pipe 130 from the bridge 140, the sample water passes through the through-holes 162$a$, and in this process, bubbles in the sample water are burst and removed. As described above, since the present disclosure includes the discs 162 in the second pipe 130, there is an effect that bubbles not removed through the bubble removal pipes 152 and remaining in sample water are easily removed through the discs 162.

A top disc 162-1 that is the uppermost one of the discs 162 is positioned lower than the bridge 140, so sample water moving to the lower end of the second pipe 130 from the bridge 140 is guided to the top disc 162-1 and then moves down. As described above, the disc assembly 160 is formed in an appropriate size to occupy only a necessary part in the second pipe 130, so there is an effect of being able to reduce the manufacturing cost.

A bottom disc 162-2 that is the lowermost one of the discs 162 is positioned to be spaced upward apart from the lower end of the second pipe 130 and a supporting protrusion 163 is formed at the lower end of the second pipe 130 to support the bottom disc 162-2. Since the bottom disc 162-2 is spaced upward apart from the lower end of the second pipe 130 by the supporting protrusion 163, sample water can move to the outflow hole 131$b$ through the bottom disc 162-2, so bubbles in sample water burst through the through-holes 162$a$ formed through the bottom disc 162-2.

Meanwhile, since most of the bubbles of sample water flowing into the first pipe 120 are removed through the bubble removal pipes 152, the disc assembly 160 may be omitted, depending on cases.

Hereafter, operation of the constant flow conditioner having a microbubble removal function according to a preferred embodiment of the present disclosure is described.

Figure 7:
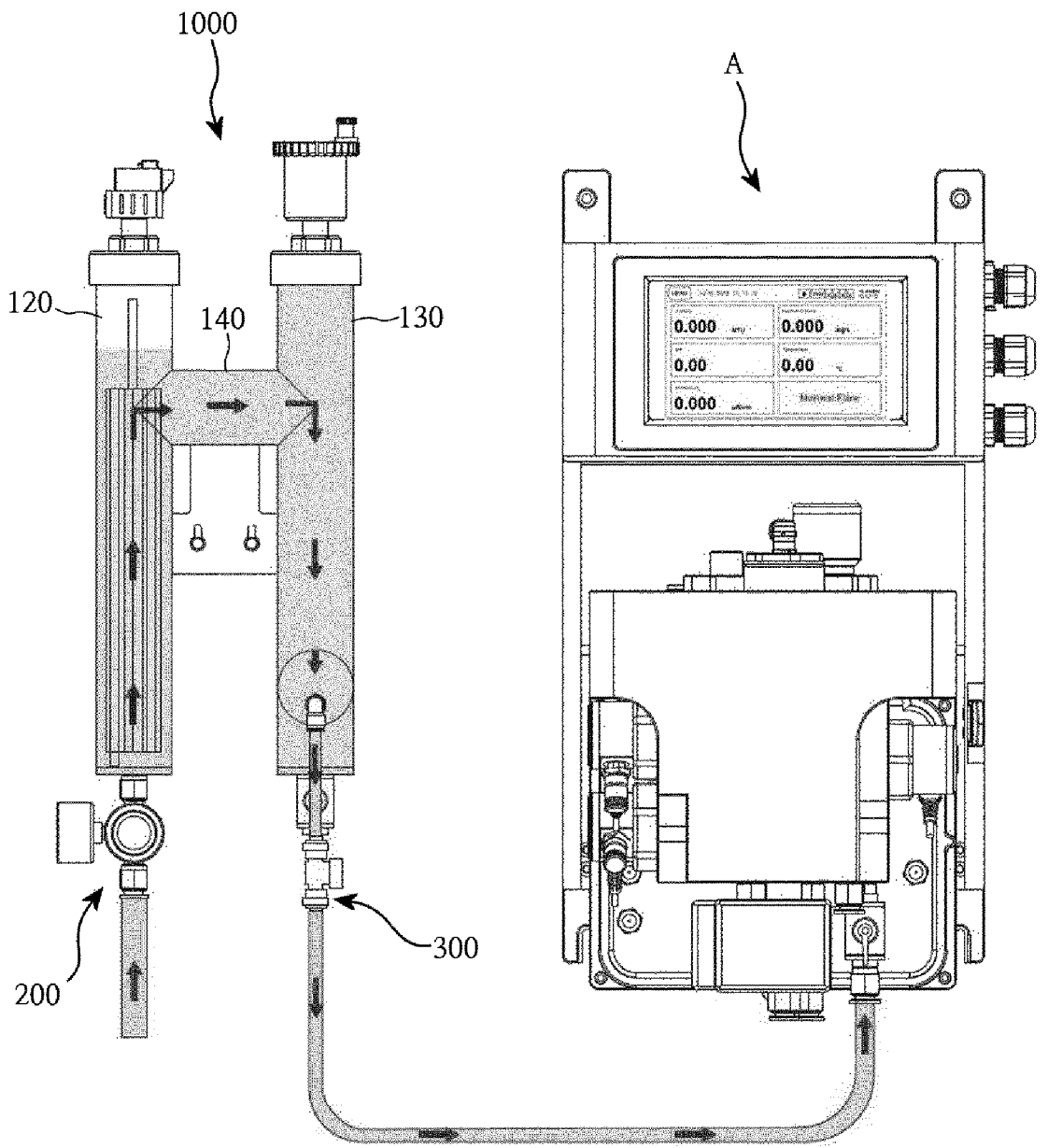
FIG. 7 is a view illustrating operation of the constant flow conditioner having a microbubble removal function according to a preferred embodiment of the present disclosure.

FIG. 7 is a view illustrating operation of the constant flow conditioner having a microbubble removal function according to a preferred embodiment of the present disclosure.

Referring to the figure, sample water that is supplied from the outside flows into the first pipe 120 through the constant pressure valve 200. In this process, the constant pressure valve 200 adjusts the flow rate and pressure of the sample water from the outside to reference levels and then sends the sample water into the first pipe 120. Further, the sample water flowing in the first pipe 120 moves to the second pipe 130 through the bridge 140 and is then discharged out of the body 110 through the outflow hole 131$b$. In this process, the resistance valve 300 makes the sample water that is discharged out of the body 110 be supplied at constant flow rate and pressure to the water quality meter A.

Further, when sample water flows into the first pipe 120, bubbles in the sample water gradually gather into large bubbles while sticking to the bubble removal pipes 152. The gathering bubbles moves to the second pipe 130 through the bridge 140 and go out through the air vent 180. When sample water flows into the second pipe 130, bubbles in the sample water burst through the through-holes 162$a$ of the discs 162, so bubbles not removed through the bubble removal pipes 152 and remaining in the sample water moves up while passing through the discs 162 in the second pipe 130 and then go out through the air vent 180.

Although the present disclosure was described above with reference to the embodiment, the present disclosure is not limited to the embodiment and it is apparent to those skilled in the art that the present disclosure may be changed and modified in various ways within the scope of the present disclosure. Further, the changes and modifications should be construed as being included in the present disclosure if they belong to the claims.

[Research and Development Project Supported This invention]
[Project Identification Number]: 1425157502
[Project Number]: S3199752
[Institution Name]: Korea Ministry of SMEs and Startups
[Project Management (professional) Institution Name]: Korea Technology and Information Promotion Agency for SMEs.
[Research Project Name]: SMEs Commercialization Technology Development Project (General, R&D)
[Research Name]: Integrated safety management system for military off-base water supply facilities
[Contribution Rate]: 1/1
[Project Execution Institution]: Bluesen Co., Ltd.
[Research Period]: Oct. 1, 2021.~Sep. 30, 2023.

The invention claimed is:

1. A constant flow conditioner having a microbubble removal function, the constant flow conditioner comprising:

a body including a first pipe formed in a hollow column shape and configured to receive sample water through an open first end thereof, a second pipe positioned parallel with the first pipe with a gap therebetween, formed in a hollow column shape, and configured to discharge sample water through an open first end thereof, and a bridge connecting a side of the first pipe and a side of the second pipe to each other;

a constant pressure valve mounted at a first end of the first pipe such that sample water from the outside flows at constant flow rate and pressure into the first pipe;

a resistance valve mounted at a first end of the second pipe such that sample water flowing through the second pipe is discharged at constant flow rate and pressure out of the second pipe; and a plurality of strainers formed in pipe shapes and installed in the first pipe, wherein sample water flowing into the first pipe flows to the second pipe sequentially through the strainers and the bridge, and when sample water flowing in the first pipe passes through the strainers, bubbles in the sample water sticks to outer walls or inner walls of the strainers.

2. The constant flow conditioner of claim 1, wherein the first pipe is connected to a first side of the bridge, a lower end of the first pipe extends lower than the first side of the bridge, and an upper end of the first pipe extends higher than the first side of the bridge, the second pipe is connected to a second side of the bridge, a lower end of the second pipe extends lower than the second side of the bridge, and an upper end of the second pipe extends higher than the second side of the bridge, and lower ends of the strainers are positioned to face the lower end of the first pipe and upper ends of the strainers are positioned lower than an upper portion of the bridge.

3. The constant flow conditioner of claim 2, wherein the strainers include:

a plurality of bubble removal pipes formed in hollow pipe shapes and connected with each other on outer edges adjacent to each other; and a movement guide pipe connected to first sides of the bubble removal pipes and having a first end extending higher than the bubble removable pipes.

4. The constant flow conditioner of claim 2, wherein the strainers include:

a plurality of bubble removal pipes formed in hollow pipe shapes and connected with each other on outer edges adjacent to each other; and a gap guide pipe connected to first sides of the bubble removal pipes and having a first end extending lower than the bubble removable pipes, wherein a lower end of the gap guide pipe is positioned to be supported by the lower end of the first pipe, and lower ends of the bubble removal pipes are positioned to be spaced apart from the lower end of the first pipe.

5. The constant flow conditioner of claim 1, wherein a pressure switch configured to sense variation of internal pressure of the first pipe and transmit a contact signal to the outside is mounted at a second end of the first pipe.

6. The constant flow conditioner of claim 5, wherein the pressure switch checks whether internal pressure of the first pipe increases over the atmospheric pressure and transmits a contact signal of an on or off state to the outside.

7. The constant flow conditioner of claim 1, wherein an air vent configured to discharge air or bubbles in the second pipe to the outside such that internal pressure of the second pipe is maintained at a predetermined level is mounted at a second end of the second pipe.

* * * * *